3,288,777
METALLIZED MONOAZODYESTUFFS CONTAINING A DIHALOPYRIMIDYL GROUP
Jakob Benz, Oberwil, Basel-Land, and August Schweizer, Muttenz, Basel-Land, Switzerland, assignors to Sandoz Ltd. (also known as Sandoz A.G.), Basel, Switzerland
No Drawing. Filed Mar. 4, 1963, Ser. No. 262,377
Claims priority, application Switzerland, Nov. 29, 1957, 53,195/57; July 27, 1961, 8,863/61; Dec. 18, 1962, 14,832/62
15 Claims. (Cl. 260—146)

The present application is a continuation-in-part of our application Ser. No. 775,346, filed November 21, 1958 (abandoned since the filing of the present application), and relates to metalliferous azo dyestuffs bearing a reactive dihalopyrimidyl group. Especially, it concerns the 1:1 copper, 1:1 nickel, 1:2 chromium and 1:2 cobalt complex compounds of the monoazo dyestuffs of the formula

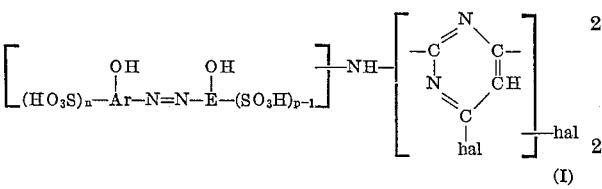
(I)

wherein Ar is an aromatic radical selected from the benzene and naphthalene series bearing —OH in ortho-position to —N=N—,
E—OH is the radical of a coupling component selected from the hydroxy-naphthalene and the 5-pyrazolone series, —OH being in a position vicinal to —N=N—,
hal is a halogen atom with an atomic number from 17 to 35, inclusive, i.e., is chlorine or bromine,
$n$ is an integer from 1 to 2 inclusive,
$p$ is an integer from 1 to 3, inclusive, the whole metal complex compound bearing at least two and at most six sulfonic acid groups.

Among the metal complex compounds of the monoazo dyestuffs encompassed by the above Formula I the following groups are especially valuable:

(a) The 1:1 copper, 1:1 nickel, 1:2 chromium or 1:2 cobalt complex compounds of the monoazo dyestuffs of the formula

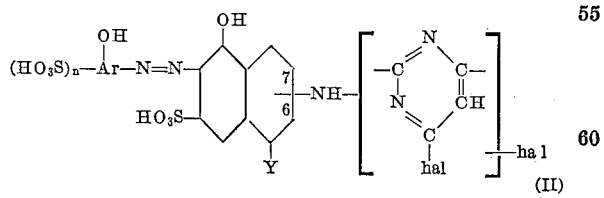
(II)

wherein Ar is an aromatic radical selected from the benzene and naphthalene series bearing —OH in ortho-position to —N=N—,
hal is a halogen atom with an atomic number from 17 to 35 inclusive,
Y is a member selected from the group consisting of hydrogen and —SO$_3$H,
and $n$ is an integer from 1 to 2, inclusive, the group —NH— being bound to one of the positions 6 and 7 and the whole metal complex compound bearing at least two and at most four sulfonic acid groups;

(b) The 1:1 copper, 1:1 nickel, 1:2 chromium or 1:2 cobalt complex compounds of the monoazo dyestuffs of the formula

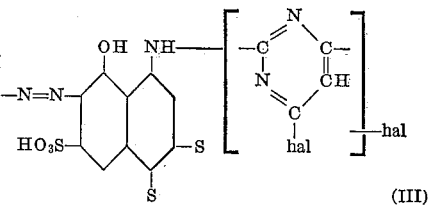
(III)

wherein Ar$_1$ is a naphthalene radical bearing OH in ortho-position to —N=N—,
hal is a halogen atom with an atomic number from 17 to 35 inclusive,
one $s$ is a hydrogen atom
and the other $s$ is —SO$_3$H
and $n$ is an integer from 1 to 2, inclusive, the whole metal complex compound bearing at least three and at most six sulfonic acid groups;

(c) The 1:1 copper or 1:1 nickel complex compounds of the monoazo dyestuffs of the formula

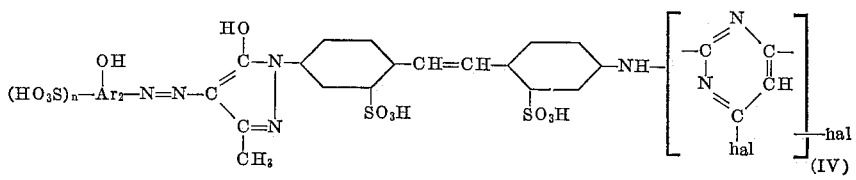
(IV)

wherein Ar$_2$ is a radical of the benzene series,
hal is a halogen atom with an atomic number from 17 to 35, inclusive,
and $n$ is an integer from 1 to 2, inclusive;

(d) The 1:1 copper, 1:1 nickel, 1:2 chromium or 1:2 cobalt complex compounds of the monoazo dyestuffs of the formula

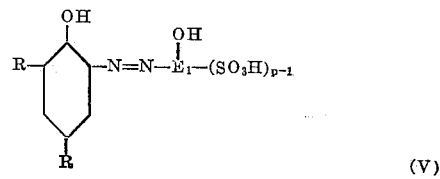
(V)

wherein E$_1$—OH is the radical of a hydroxy-naphthalene coupled in ortho-position to —OH,
one R is —SO$_3$H
the second R is

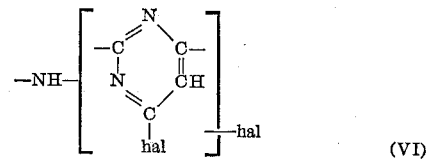
(VI)

hal being a halogen atom with an atomic number from 17 to 35, inclusive,
and $p$ is an integer from 1 to 3 inclusive, the whole metal complex compound bearing at least two and at most four sulfonic acid groups;

(e) The 1:2 chromium or 1:2 cobalt complex compounds of the monoazo dyestuffs of the formula

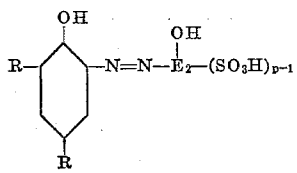    (VII)

wherein E₂—OH is the radical of an enolized 5-pyrazolone coupled in a position vicinal to —OH,
one R is —SO₃H,
the second R is

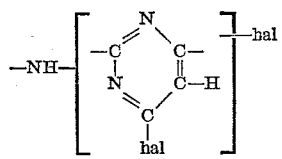    (VI)

hal being a halogen atom with an atomic number from 17 to 35, inclusive,
and p is an integer from 1 to 3, inclusive,
the whole metal complex compound bearing at least two and at most six sulfonic acid groups.

A process for the production of the metal complex compounds of the monoazo dyestuffs of the Formula I consists in reacting 1 mole of a dyestuff of the formula

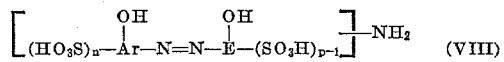    (VIII)

in either order with 1 mole of a 2,4,6-trihalopyrimidine and with a metal-yielding agent, so that one halogen atom of the 2,4,6-trihalopyrimidine combines with one hydrogen atom of the amino group and the remaining dihalopyrimidyl radical becomes attached to the dyestuff radical through the —NH— bridge member, and that the metal-yielding agent reacts with the ortho-orho'-dihydroxy-azo grouping to form the metal complex compound.

In the dyestuffs of the Formula VIII, the amino group, e.g., when it stands in ortho- or in peri-position to a hydroxy group, reacts only difficultly with the 2,4,6-trihalopyrimidine, perhaps because of the formation of a hydrogen bridge between the amino group and the vicinal hydroxy group; in these cases it is advisable to metallize first the dyestuff of the Formula VIII and, when the ortho-ortho'-dihydroxyazo group is closed by a metal atom, to carry out the condensation of the amino group with the 2,4,6-trihalopyrimidine; then the condensation proceeds smoothly and completely.

A modification of the procedure outlined above (a) consists in condensnig 1 mole of a diazo component of the formula

    (IX)

wherein n and Ar have the afore-cited meanings,
and X is a nitro group or an easily splittable acyl group, e.g., the acetyl group,
OH and X being in ortho-position to each other,
with at least 1 mole of 2,4,6-trihalopyrimidine, reducing the nitro group or splitting off the acyl group, diazotizing the amine, coupling the diazo compound with a coupling component of the hydroxynaphthalene or the 5-pyrazolone series which couples in ortho-position to the phenolic or enolic hydroxy group and metallizing the obtained dyestuff, the reactions, especially the reduction of —NO₂ or the hydrolysis of —NH— acyl, being carried out under such conditions, e.g., reduction with iron and dilute acetic acid solution at 90–95° (Béchamp method) or hydrolysis with 5–10% hydrochloric acid at 80–100°, that the dihalopyrimidyl group is not damaged;

or (b) condensing 1 mole of a coupling component of the formula

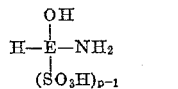    (X)

wherein p and E have the above-cited meanings, and H is in ortho-position to OH, wtih at least 1 mole of 2,4,6-trihalopyrimidine, coupling with the diazo compound of an amine of the formula

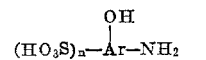    (XI)

wherein n and Ar have the above-cited meanings, and metallizing the obtained dyestuff.

A second modification of the procedure outlined above consists in simultaneously oxidizing and coppering a dyestuff of the formula

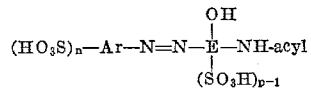    (XII)

wherein E, n and p have the above-cited meanings,
OH stands in ortho-position to —N=N—,
Ar is a benzene or naphthalene nucleus in which both ortho-positions to —N=N— or, in the case of a naphthalene nucleus bound to —N=N—, in 1-position the ortho-and para-positions to —N=N— are free,
and acyl is an easily splittable acyl group, e.g., the acetyl group, or a dihalopyrimidyl group, and when acyl is an easily splittable acyl group, splitting off this group under such conditions that the copper complex is not damaged, i.e., under alkaline conditions, e.g., in 4 to 8% sodium or potassium hydroxide solution at 80 to 100° C., and condensing with 2,4,6-trihalopyrimidine.

When, instead of the 1:1 copper complex compound, the 1:1 nickel, 1:2 chromium or 1:2 cobalt complex compound is desired, decoppering is effected by treating with an aqueous solution of a strong acid, e.g., 5–10% hydrochloric acid or with a cold aqueous solution of sodium sulfide or sodium hydrogen sulfide, the treatment being so effected that the reactive dihalopyrimidyl group remains unaffected. When acyl is, e.g., an acetyl group, decoppering can be effected simultaneously with the hydrolysis, e.g., by means of 5–10% hydrochloric acid at 80–100° C. Then the ortho-ortho'-dihydroxy azo dyestuff is precipitated in the acid medium and separated from the dissolved copper salts by filtration, whereas, when sodium sulfide or sodium hydrogen sulfide is used, copper sulfide is precipitated and the dyestuffs remain dissolved.

The radicals Ar and E in Formula I may be further substituted, e.g., by halogen atom (chlorine, bromine), nitro groups, lower alkyl groups (methyl, ethyl), acylamino groups (acetylamino, benzoylamino) or an optionally substituted sulfonic acid amide group. If E is a 5-pyrazolone radical the substituents other than the —OH group are bound to the 1-aryl radical which can be phenyl, 1- or 2-naphthyl or stilbenyl.

The condensation with 2,4,6-trihalopyrimidine is conducted preferably in aqueous medium. The halide can be applied in concentrated form or dissolved in an organic solvent. Solvents specially suitable for halopyrimidines are acetone, benzene, chlorobenzene and toluene.

The temperature of reaction depends on the reactivity of the individual starting materials and varies from 20° to 100° C., preferably from 40° to 80° C. If temperatures higher than about 40° C. are necessary, it is advisable in view of the volatility of 2,4,6-trihalopyrimidines in water-steam to work with vessels fitted with reflux condensers.

The reaction is carried out in a weakly alkaline, neutral or weakly acid medium, but preferably in the pH region of 8.0 to 4.0. To neutralize the hydrogen halide so formed an acid-binding agent, e.g., sodium acetate, is added to the reaction solution at the start of the operation, or, if preferred, small portions of sodium or potassium carbonate or sodium or potassium bicarbonate in solid powdered form or as a concentrated aqueous solution are added in the course of the reaction. Aqueous solutions of sodium or potassium hydroxide are other suitable neutralizing agents. The addition of small amounts of a wetting or emulsifying agent to the reaction mixture can accelerate the rate of reaction.

By using at least 1 mole of 2,4,6-trihalopyrimidine for the amino group to be reacted, the condensation is so controlled that only one halogen atom of the 2,4,6-trihalopyrimidine reacts with an exchangeable hydrogen atom of the amino group. Hitherto it has not been possible to determine which of the halogen atoms participates in the reaction or whether it is equally probable that either one of the two isomeric forms will be formed.

The diazotization of the amines is carried out by the direct or the indirect method at temperatures of, e.g., 0° to 15° C. The coupling reaction is conducted in a weakly acid, neutral or alkaline medium, preferably at pH 6 to 12, and at low temperatures, e.g., 5° to 10° C., if necessary in presence of organic bases such as pyridine or a mixture of pyridine bases.

The ortho-ortho'-dihydroxy azo dyestuffs are advantageously converted into the 1:1 copper or 1:1 nickel complex dyestuffs in aqueous, weakly acid (e.g., acetic acid) to weakly alkaline solution at temperatures of 40–80° C. and in presence of an aqueous solution of an alkali metal salt of a low molecular aliphatic monocarboxylic acid. The copper- or nickel-yielding agent is employed in such amounts that 1 atom of metal acts upon 1 molecule of dyestuff.

The conversion of the ortho-ortho'-dihydroxyazo dyestuffs into their 1:2 chromium or 1:2 cobalt complex compounds is carried out to best advantage in aqueous solution or in organic medium, for example formamide, or in the concentrated aqueous solution of an alkali metal salt or a low molecular aliphatic monocarboxylic acid. It is advantageous to proportion the reactants so that an amount of the metal-yielding agent containing less than two but at least one atom of metal acts upon two molecules of the monoazo dyestuff.

Suitable chromium compounds are, e.g., chromic fluoride, chromic sulfate, chromic formate, chromic acetate, potassium chromic sulfate or ammonium chromic sulfate. The chromates also, e.g., sodium or potassium chromate or bichromate, are eminently suitable for metallizing the monoazo dyestuffs. In the latter case it is advisable to work in a strongly caustic alkaline medium to which reducing substances may be added if necessary, and to carry out the metallization before the introduction of the dihalopyrimidyl group which is sensitive to strong alkalies and could be damaged.

Examples of suitable cobalt compounds are cobaltous formate, cobaltous acetate and cobaltous sulfate. When metallizing is conducted in the concentrated aqueous solution of an alkali-metal salt of a low molecular aliphatic monocarboxylic acid, water-insoluble metal compounds, e.g., cobalt hydroxide or cobalt carbonate, can also be employed. It is particularly advantageous to carry out metallizing in an aqueous or alkaline medium to which the metal compounds are added in presence of compounds which maintain the metal dissolved in complex combination in caustic alkaline medium, e.g., tartaric acid, citric acid or lactic acid. Here also it is advisable to carry out the metallization before the introduction of the dihalopyrimidyl group.

The chromium- or cobalt-containing azo dyestuffs which are obtained are homogeneous metal complex compounds in which essentially one metal atom is combined with two molecules of the monoazo compound.

The metal complex compounds are so called 1:2 complexes in which one molecule of the monoazo compound is combined with about 0.3 to 0.7 atom of metal.

The organic metallizing solution can be run into brine if desired and the metal complex compound is then precipitated from the aqueous medium by the addition of salt, filtered off, washed if necessary and dried.

The new metal-containing reactive dyestuffs are suitable for the dyeing of leather; the dyeing, padding and printing of fibers of animal origin, e.g. wool and silk; synthetic polyamide fibers, e.g. nylon; cellulosic fibers, e.g. cotton, linen; regenerated cellulosic fibers, e.g. viscose filament yarn, viscose staple fibers and cuprammonium rayon; and mixtures and/or other articles of these fibers. The optimum conditions of application vary with the nature of the fiber and the dyestuffs used.

The copper- or nickel-containing monoazo dyestuffs which bear 3 or more water-solubilizing groups, e.g., carboxylic or preferably sulfonic acid groups—other groups such as alkylsulfonyl or optionally substituted sulfonic acid amide groups have a limited importance because their introduction into the molecule is rather difficult—the chromium- or cobalt-containing dyestuffs which bear 2 or more water-solublizing groups for each molecule of the Formula I possess good solubility in water, good stability in printing pastes and padding liquors, good compatibility to salts and hard water, good reactivity with vegetable fibers, animal and synthetic polyamide fibers; they are insensitive to heavy metals such as copper, iron and chromium and reserve acetate, triacetate, polyester, polyacrylonitrile, polyvinyl chloride, polyvinyl acetate and polyalkylene fibers. In general, i.e., with the exception of the copper and nickel complex compounds of the monoazo dyestuffs of the Formula IV and of certain monoazo dyestuffs of the Formula II derived from 2-amino-5-hydroxynaphthalene-7-sulfonic acid, they are rather slightly substantive or not substantive at all, so that the unfixed dyestuff portion can easily be removed from the dyeings and prints on cellulosic fibers.

The copper- or nickel-containing monoazo dyestuffs which bear 2 to 3 water-solubilizing groups and also the copper and nickel complex compounds of the monoazo dyestuffs of the Formula IV and of certain monoazo dyestuffs of the Formula II derived from 2-amino-5-hydroxynaphthalene-7-sulfonic acid, which contain 3 or 4 water-solubilizing groups, preferably sulfonic acid groups are especially suitable for the so-called exhaustion dyeing of cellulosic fibers, whereas for the chromium- or cobalt-containing dye stuffs which bear 1 to 2 water-solubilizing groups for each molecule of the Formula I the principal application field is the normal acid dyeing of wool, silk and synthetic polamide fibers.

Animal fibers and synthetic polyamide fibers are dyed, printed or fixed preferably in acid, neutral or weakly alkaline medium, e.g., in presence of acetic, formic or sulfuric acid, ammonium sulfate, sodium metaphosphate, etc. Dyeing can be carried out in a neutral to acetic acid medium in presence of levelling agents, e.g., polyoxethylated fatty amines or mixtures of these and alkylpolyglycol ethers, and the bath adjusted to a neutral or weakly alkaline reaction at the end of dyeing by the addition of small amounts of an agent of alkaline reaction, e.g., ammonia, sodium bicarbonate, sodium carbonate, etc., or of compounds which react alkaline on heating, e.g., hexamethylene tetramine, urea. The goods are then well rinsed and if necessary soured with a little acetic acid.

The dyeing, padding and printing or fixing of the dyestuffs on cellulosic fibers is carried out in alkaline medium, e.g., in presence of sodium bicarbonate, sodium carbonate, sodium hydroxide solution, potassium hydroxide solution, sodium metasilicate, sodium borate, trisodium phosphate, ammonia etc. To prevent reduction effects during dyeing, padding or printing it is often advantageous to use a mild oxidizing agent, e.g., sodium 1-nitrobenzene-3-sulfonate. The fixation of the dyestuffs on cellulose fibers is carried out as a rule with heating, e.g., by steaming, by thermofixing, by treatment in a hot aqueous alkaline solution containing neutral salts or by conditioning in a hot moist atmosphere. The dyestuffs which are well soluble in a solution containing neutral salts, e.g., calcined sodium sulfate in amounts of about 20 to about 150 grams per liter and a strong alkali, e.g., sodium metasilicate, trisodium phosphate, sodium or potassium hydroxide and in this solution possess a sufficient substantivity to draw onto cellulosic fibers can also be dyed and fixed by impregnation and storage at lower temperatures, e.g., 20° to 40° C. (Pad Batch Dyeing Process).

The addition of certain quaternisable amines such as trimethylamine, triethylenediamine, asymmetric dimethylhydrazine, N-amino-pyrrolidine, preferably in stoichiometric amounts, accelerates the fixation of the dyestuff on the fiber, so that the fixation temperature can be lowered and/or the fixation time shortened.

The dyeings and prints on cellulosic fibers are notable for their outstanding wet fastness properties which are due to the formation of a chemical linkage between the dyestuff molecule and the cellulose molecule. Often the total amount of applied dyestuff does not take part in the reaction, in which case the unfixed dyestuff is removed by suitable treatment such as rinsing and/or soaping, if necessary at higher temperature. For this purpose synthetic detergents, e.g. alkylarylsulfonates, sodium lauryl sulfate, sodium lauryl polyglycol ether sulfate, optionally carboxymethylated alkylpolyglycol ethers, mono- and dialkylphenylpolyglycol ethers, can be used.

The dyeings and prints on cellulosic fibers possess good fastness to light, washing, water, sea water, cross dyeing, perspiration, pressing, rubbing, alkali, e.g., soda ash, soda boiling, acids, e.g., acetic acid, tartaric acid, citric acid and fruit juices, vulcanizing, chlorine, e.g., chlorinated swimming pool water, bleaching (peroxides), gas fumes and dry cleaning (organic solvents). In addition they are stable to resin finishing and to acid and alkaline hydrolytic influences. The dyeings and prints on wool and synthetic polyamide fibers possess a good fastness to light and excellent fastness properties to washing, water, sea water, milling, perspiration, rubbing, pressing, sublimation and dry cleaning.

In the following examples the parts and percentages are by weight and the temperatures in degrees centigrade.

Example 1

9.5 parts of 1-amino-2-hydroxybenzene-5-sulfonic acid are suspended in 200 parts of water and 2 parts of 30% hydrochloric acid are added to the suspension. Diazotization is carried out at 10–15° by adding a concentrated aqueous solution of 3.5 parts of sodium nitrite and stirring the suspension until all is dissolved. The solution of the diazo compound is run into a solution cooled to 5–10° of 12 parts of 2-amino-5-hydroxynaphthalene-7-sulfonic acid and 20 parts of sodium carbonate in 200 parts of water. When coupling is completed the solution is heated to 50–60°, then the formed monoazo dye is precipitated by the addition of sodium chloride, filtered off and washed with a solution of sodium chloride.

The dye paste is dissolved in 500 parts of water at 70° and the pH-value is adjusted to 5 by the addition of a little 40% acetic acid solution. After the addition of 15 parts of crystallized sodium acetate a solution of 12.5 parts of crystallized copper sulfate is added at 70–80° in such an amount that the monoazo dye is entirely converted into the copper complex compound. The metallized dye is precipitated by the addition of sodium chloride, filtered off and washed with a sodium chloride solution.

The moist copper complex dye is dissolved in 500 parts of water at 70° and the solution is adjusted to the pH-value of 5. After the addition of 9 parts of 2,4,6-trichloropyrimidine the reaction mixture is vigorously stirred at 65–70° with reflux, a dilute sodium carbonate solution being added to produce a constant weakly acid reaction (pH-value 4–6). The reaction product is then precipitated with sodium chloride. After filtration, the press cake is dried in vacuo at 70–85°. The ground dyestuff is a dark powder which dissolves in water with a blue-red coloration.

1 part of the copper-containing dyestuff obtained as above is dissolved in 3000 parts of softened water at 60°. 100 parts of wetted viscose rayon are entered in this dyebath.

The temperature is increased to 90° in 15 minutes and dyeing continued for 45 minutes at the same temperature with constant agitation of the goods. During this time 200 parts of calcined sodium sulfate are added in 3 portions. At this point a concentrated solution of 5 parts of sodium 1-nitrobenzene-3-sulfonate is added, followed by 30 parts of trisodium phosphate. The material is then worked about in the alkaline bath for 1 hour at 90°. The dyeing thus obtained is rinsed in cold and warm water, soaped at the boil for 20 minutes, well rinsed and dried.

A bluish red dyeing of good light and wet fastness is produced.

The following Table 1 contains further metalliferous azo dyestuffs prepared in a manner similar to that described in Example 1; they are the 1:1 copper, 1:1 nickel, 1:2 chromium or 1:2 cobalt complex compounds of the dyestuffs of the formula

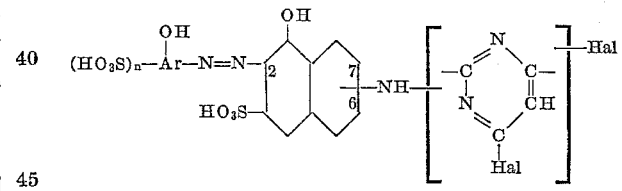

and are characterized by the diazo component

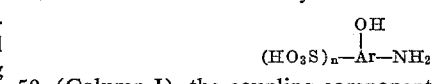

(Column I), the coupling component

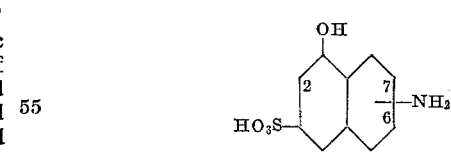

coupled in the position to 2 (Column II), the halogen (Column III), the metal employed for the metal complex formation (Column IV) and the shade of the dyeing on cotton (Column V).

TABLE 1

| Example No. | (I) | (II) | (III) | (IV) | (V) |
|---|---|---|---|---|---|
| 2 | 1-amino-2-hydroxybenzene-5-sulfonic acid | 1-hydroxy-7-aminonaphthalene-3-sulfonic acid | Cl | Cu | Bluish red. |
| 3 | 1-amino-2-hydroxy-5-methylbenzene-4-sulfonic acid. | 1-hydroxy-6-aminonaphthalene-3-sulfonic acid. | Cl | Cu | Do. |
| 4 | 1-amino-2-hydroxybenzene-3,5-disulfonic acid. | ___do___ | Cl | Cu | Do. |
| 5 | ___do___ | ___do___ | Br | Cu | Do. |
| 6 | ___do___ | ___do___ | Cl | Ni | Do. |
| 7 | ___do___ | 1-hydroxy-7-aminonaphthalene-3-sulfonic acid. | Cl | Cu | Do. |
| 8 | 1-amino-2-hydroxy-3-carboxybenzene-5-sulfonic acid. | 1-hydroxy-6-aminonaphthalene-3-sulfonic acid. | Cl | Cu | Do. |
| 9 | 1-amino-2-hydroxybenzene-5-sulfonic acid. | 1-hydroxy-6-aminonaphthalene-3,5-disulfonic acid. | Cl | Cu | Do. |

TABLE 1—Continued

| Example No. | (I) | (II) | (III) | (IV) | (V) |
|---|---|---|---|---|---|
| 10 | 1-amino-2-hydroxynaphthalene-4-sulfonic acid. | 1-hydroxy-6-aminonaphthalene-3-sulfonic acid. | Cl | Cu | Reddish blue. |
| 11 | 1-amino-2-hydroxynaphthalene-4,6-disulfonic acid. | do | Cl | Cu | Do. |
| 12 | do | do | Br | Cu | Do. |
| 13 | 1-amino-2-hydroxy-3-chlorobenzene-5-sulfonic acid. | do | Cl | Cr | Violet. |
| 14 | { 1-amino-2-hydroxy-3-chlorobenzene-5-sulfonic acid. <br> 1-amino-2-hydroxy-3-chlorobenzene-5-sulfonic acid. | 1-hydroxy-6-aminonaphthalene-3-sulfonic acid. <br> 2-hydroxy-8-acetyl-aminonaphthalene. | } Cl | Cr | Reddish navy blue. |
| 15 | { 1-amino-2-hydroxy-3-chlorobenzene-5-sulfonic acid. <br> 1-amino-2-hydroxybenzene-5-sulfonic acid. | 1-hydroxy-6-aminonaphthalene-3-sulfonic acid. <br> 2-hydroxy-8-aminonaphthalene. | Cl <br> Cl | } Cr | Do. |
| 16 | 1-amino-2-hydroxy-5-chlorobenzene-3-sulfonic acid. | 1-hydroxy-7-aminonaphthalene-3-sulfonic acid. | Cl | Cr | Blue-violet. |
| 17 | 1-amino-2-hydroxy-3-chlorobenzene-5-sulfonic acid. | 1-hydroxy-6-aminonaphthalene-3-sulfonic acid. | Br | Cr | Violet. |
| 18 | 1-amino-2-hydroxybenzene-5-sulfonic acid. | do | Cl | Co | Violettish brown. |
| 19 | do | do | Br | Co | Do. |

*Example 20*

25 parts of 1-diazo-2-hydroxynaphthalene-4-sulfonic acid are added to a solution of 32 parts of 1-amino-8-hydroxynaphthalene-3,6-disulfonic acid, 30 parts of sodium carbonate and 30 parts of pyridine in 300 parts of water. The reaction mixture is stirred for several hours at room temperature until coupling is complete. It is then acidified with hydrochloric acid and sodium chloride added causing precipitation of the blue monoazo dye, which is filtered off and washed with a sodium chloride solution acidified with hydrochloric acid.

The moist dye is dissolved in 400 parts of water at 70° and the solution adjusted to a pH-value of 4 with sodium hydroxide solution. 27 parts of crystallized sodium acetate are added. At 70–80° a concentrated aqueous solution of 25 parts of crystallized copper sulfate is run in in sufficient quantity to bring about complete conversion of the monoazo dye into its copper complex compound. When this is accomplished 15 parts of 2,4,6-trichloropyrimidine are added and the reaction mixture stirred in a closed vessel at 70–80°, the pH-value being maintained between 4 and 6 by the gradual addition of 20% sodium carbonate solution. When the reaction has run its course the product is precipitated with sodium chloride and cooling, then filtered off and washed with dilute sodium chloride solution. On drying and grinding it is obtained as a brown-black powder which dissolves in water with a violet coloration.

In the following Table 2 are listed metalliferous azo dyestuffs obtained in a manner similar to that described in Example 20; they are the 1:1 copper, 1:1 nickel, 1:2 chromium or 1:2 cobalt complex compounds of the dyestuffs of the formula

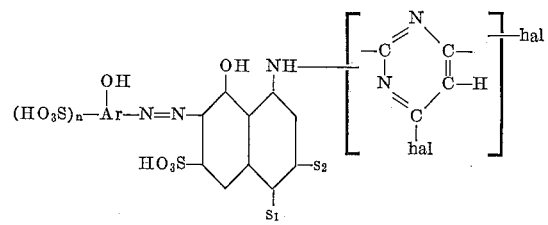

and are characterized by the diazo component

(Column I), the symbols, $s_1$, $s_2$ and hal (Columns II, III and IV), the metal used for the metal complex formation (Column V) and the shade of the dyeing on cotton (Column VI).

TABLE 2

| Example No. | (I) | (II) | (III) | (IV) | (V) | (VI) |
|---|---|---|---|---|---|---|
| 21 | 1-hydroxy-2-aminonaphthalene-4-sulfonic acid. | H | SO₃H | Cl | Cu | Violet. |
| 22 | do | H | SO₃H | Cl | Ni | Red-violet. |
| 23 | 1-hydroxy-2-aminoanaphthalene-4,6-disulfonic acid. | H | SO₃H | Cl | Cu | Violet. |
| 24 | do | H | SO₃H | Br | Cu | Do. |
| 25 | 1-hydroxy-2-aminonaphthalene-4,8-disulfonic acid. | H | SO₃H | Cl | Cu | Do. |
| 26 | 1-amino-2-hydroxynaphthalene-4-sulfonic acid. | SO₃H | H | Cl | Cu | Do. |
| 27 | do | H | SO₃H | Cl | Cr | Dark green. |
| 28 | do | H | SO₃H | Br | Cr | Do. |
| 29 | do | SO₃H | H | Cl | Cr | Do. |
| 30 | do | H | SO₃H | Cl | Co | Gray-black. |

*Example 31*

27 parts of 1-amino-2-hydroxybenzene-3,5-disulfonic acid are dissolved in 150 parts of water and diazotized at 15° with 7 parts of sodium nitrite.

47.5 parts of 1-[4″-aminostilbenyl-(4′)]-3-methyl-5-pyrazolone-2′,2″-sulfonic acid are dissolved in 300 parts of water with the addition of sodium hydroxide solution at pH 7–8. On cooling to 10° 20 parts of sodium bicarbonate are added to the solution. The diazo compound prepared as given above is allowed to flow slowly into this mixture with good stirring. It couples to form a yellow monoazo dye.

On completion of the coupling reaction the solution is adjusted to pH 4.5 with hydrochloric acid and heated to 80°. 27 parts of crystallized sodium acetate are added, then an aqueous solution of 25 parts of crystallized copper sulfate is run in. The reaction mixture is stirred for a further hour at 80°. The copper complex compound of the monoazo dye thus formed is precipitated by the addition of sodium chloride and cooling to 30°, filtered off, and purified by redissolving and reprecipitation from the aqueous solution.

The purified copper complex compound is dissolved in 1000 parts of water at 80°. 15 parts of 2,4,6-trichloropyrimidine are added. The reaction mass is stirred in a closed vessel at 80–90°, its pH value being maintained between 6 and 7 by adding 20% sodium carbonate solution. When the reaction is finished the product is precipitated at 50° with sodium chloride, filtered off, washed with dilute soduim chloride solution, dried and ground. A brown power is obtained which dissolves in water to give yellow-brown solutions.

Mercerized cotton sateen fabric is dyed with this dye by the method given in Example 1 except that the trisodium phosphate there used is replaced by an equal amount of sodium or potassium carbonate. A yellow-brown dyeing fast to light and wet treatments is obtained.

The following Table 3 contains further metalliferous azo dyestuffs produced in a manner similar to that described in Example 31; they are the 1:1 copper or 1:1 nickel complex compounds of dyestuffs of the formula The dye paste is dissolved in 500 parts of water at 70° and the solution adjusted to the pH-value of 5. Then 27 parts of crystallized sodium acetate are added, followed by a solution of 25 parts of crystallized copper sulfate at 70–80° in an amount sufficient to completely convert the aminoazo dye into the copper complex compound. The resulting metallized aminomonoazo dye is completely precipitated by the addition of sodium chloride, filtered off and washed with aqueous sodium chloride solution.

The moist dye paste is dissolved in 1000 parts of water at 80°. 16 parts of 2,4,6-trichloropyrimidine are added and the mixture stirred in the closed vessel at 80–90°. The pH-value is maintained between 5 and 6 by adding a 20% sodium carbonate solution. When the reaction is finished the product is precipitated by adding sodium chloride and cooling, and then filtered off, washed with aqueous sodium chloride solution, dried and ground. It is obtained as a dark brown power which dissolves in water a blue-red coloration.

A mercerized cotton fabric is padded with a warm, neutral solution of 3 parts of the above copper complex dye and 1 part of sodium 3-nitrobenzene-1-sulfonate in 100 parts of water, and squeezed to retain about 85% of its weight of the solution. After drying, it is entered in a bath of 250 parts of anhydrous sodium sulfate and

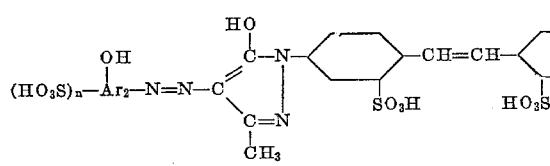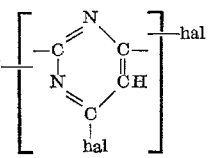

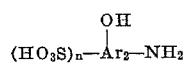

and are characterized by the diazo component $(HO_3S)_n-Ar_2-NH_2$ (OH on Ar_2)

(Column I), the halogen (Column II), the metal used for the metal complex formation (Column III) and the shade of the dyeing on cotton (Column IV).

30 parts of sodium carbonate per 1000 parts treated with agitation for about 45 minutes at 80–90° to fix the dyeing. The liquor ratio of this bath may be 1:10 to 1:50. On fixation, the dyed fabric is rinsed well and dried. The bluish red dyeing obtained has excellent light and wet fastness.

In the following Table 4 are disclosed further metal-

TABLE 3

| Ex. No. | (I) | (II) | (III) | (IV) |
|---|---|---|---|---|
| 32 | 1-amino-2-hydroxybenzene-5-sulfonic acid. | Cl | Cu | Yellow-brown. |
| 33 | ---do--- | Cl | Ni | Do. |
| 34 | 1-amino-2-hydroxybenzene-3,5-disulfonic acid. | Br | Cu | Do. |
| 35 | ---do--- | Cl | Ni | Do. |
| 36 | 1-amino-2-hydroxy-3-carboxy-benzene-5-sulfonic acid. | Cl | Cu | Do. |
| 37 | ---do--- | Cl | Ni | Do. |
| 38 | 1-amino-2-hydroxy-3-chlorobenzene-5-sulfonic acid. | Cl | Cu | Do. |
| 39 | 1-amino-2-hydroxy-5-chlorobenzene-3-sulfonic acid. | Br | Cu | Do. |
| 40 | 1-amino-2-hydroxy-5-nitrobenzene-3-sulfonic acid. | Cl | Ni | Do. |
| 41 | 1-amino-2-hydroxy-3-nitrobenzene-5-sulfonic acid. | Cl | Cu | Do. |

*Example 42*

A suspension of 24.6 parts of 1-amino-2-hydroxy-3-acetylaminobenzene-5-sulfonic acid in 100 parts of water, 100 parts of ice and 5 parts of 20% hydrochloric acid is diazotized at 3–5° with 29.5 parts of 4 normal sodium nitrite solution. The diazo compound is run slowly into a solution of 24 parts of 2-hydroxynaphthalene-6-sulfonic acid and 25 parts of sodium carbonate in 350 parts of water. On completion of coupling the resulting acetylaminomonoazo dye is precipitated with sodium chloride, filtered off and washed with aqueous sodium chloride solution.

The moist filter cake is entered into 700 parts of 5% hydrochloric acid. The mixture is brought to the boil and boiled for 1–2 hours until the acetyl group is split off. The aminomonoazo dye is precipitated by adding sodium chloride with cooling, filtered off and washed with aqueous sodium chloride solution.

liferous azo dyestuffs produced in a manner similar to that described in Example 42; they are the 1:1 copper, 1:1 nickel, 1:2 chromium or 1:2 cobalt complex compounds of the dyestuffs of the formula

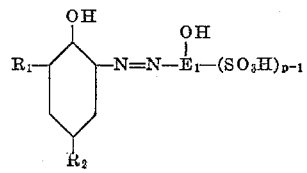

and are characterized by the symbols $R_1$ and $R_2$ (Columns I and II), the coupling component

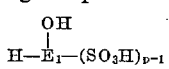

coupled in ortho-position to —OH (Column III), the metal used in the metal complex formation (Column IV)

and the shade of the dyeing on cotton (Column V); in Columns I or II dichloropyr. and dibromopyr. represent

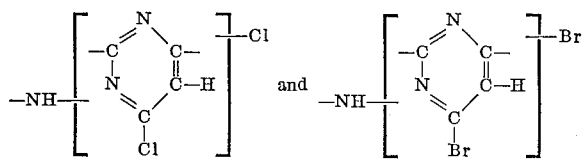

washed with aqueous sodium chloride solution. After drying and grinding a dark brown powder is obtained which dissolves in water with a brown coloration.

A mercerized cotton sateen fabric is printed with a printing paste of the following composition:

20 parts of the above dye
100 parts of urea
405 parts of water
450 parts of a 3% sodium alginate thickening

TABLE 4

| Example No. | (I) | (II) | (III) | (IV) | (V) |
|---|---|---|---|---|---|
| 43 | Dichloropyr | —$SO_3H$ | 1-hydroxynaphthalene-4-sulfonic acid. | Cu | Bluish red. |
| 44 | Dichloropyr | —$SO_3H$ | 1-hydroxynaphthalene-3,6-disulfonic acid. | Cu | Do. |
| 45 | Dichloropyr | —$SO_3H$ | ....do.... | Ni | Red. |
| 46 | Dichloropyr | —$SO_3H$ | 1-hydroxynaphthalene-4,6-disulfonic acid. | Cu | Bluish red. |
| 47 | Dibromopyr | —$SO_3H$ | ....do.... | Cu | Do. |
| 48 | —$SO_3H$ | Dichloropyr | ....do.... | Cu | Do. |
| 49 | —$SO_3H$ | Dichloropyr | 1-hydroxynaphthalene-3,6-disulfonic acid. | Cu | Do. |
| 50 | —$SO_3H$ | Dichloropyr | 2-hydroxynaphthalene-3,6-disulfonic acid. | Ni | Red. |
| 51 | —$SO_3H$ | Dichloropyr | 2-hydroxynaphthalene-6-sulfonic acid. | Cr | Gray-violet. |
| 52 | —$SO_3H$ | Dichloropyr | 2-hydroxynaphthalene-4-sulfonic acid. | Co | Bluish red. |
| 53 | Dichloropyr | —$SO_3H$ | ....do.... | Cr | Gray-violet. |
| 54 | Dichloropyr | —$SO_3H$ | 1-hydroxynaphthalene-4-sulfonic acid. | Cr | Do. |
| 55 | Dibromopyr | —$SO_3H$ | ....do.... | Cr | Do. |
| 56 | Dibromopyr | —$SO_3H$ | ....do.... | Co | Bordeaux. |
| 57 | Dichloropyr | —$SO_3H$ | ....do.... | Co | Do. |
| 58 | Dichloropyr | —$SO_3H$ | 1-hydroxy-6-phenylamino-naphthalene-3-sulfonic acid. | Cr | Reddish gray. |
| 59 | Dichloropyr | —$SO_3H$ | 1-hydroxy-6-phenylamino-naphthalene-3,3'-disulfonic acid. | Cu | Bordeaux. |
| 60 | Dichloropyr | —$SO_3H$ | 2-hydroxynaphthalene. | Co | Bluish red. |
| 61 | Dichloropyr | —$SO_3H$ | 2-hydroxy-8-acetylaminonaphthalene. | Cr | Gray. |

Example 62

A suspension of 24.6 parts of 1-amino-2-hydroxy-3-acetylaminobenzene-5-sulfonic acid in 100 parts of water, 100 parts of ice and 5 parts of 20% hydrochloric acid is diazotized at 3–5° with 29.5 parts of 4 normal sodium nitrite solution. The diazo compound is run slowly into a solution of 35 parts of 1-(2',5'-dichlorophenyl)-3-methyl-5-pyrazolone-4'-sulfonic acid and 25 parts of sodium carbonate in 350 parts of water. On completion of coupling the resulting acetylaminomonoazo dye is precipitated with sodium chloride, filtered off and washed with aqueous sodium chloride solution.

The moist filter cake is entered into 700 parts of 5% hydrochloric acid. The mixture is brought to the boil and boiled for 1–2 hours until the acetyl group is split off. The aminomonoazo dye is precipitated by adding sodium chloride with cooling, filtered off and washed with aqueous sodium chloride solution.

The dye paste is dissolved in 500 parts of water at 60–70° and the solution adjusted to the pH 5–6. A concentrated aqueous solution of 12 parts of crystallized cobalt sulfate ($CoSO_4 \cdot 7H_2O$) is run in at an even rate and in sufficient quantity to completely transform the aminoazo dye into the 1:2 metal complex compound. At the same time the pH-value is maintained between 5 and 6 by the addition of 20% sodium carbonate solution.

When formation of the metal complex is complete, 14 parts of 2,4,6-trichloropyrimidine are added and the reaction mass stirred in the closed vessel for several hours at 80–90°. The pH-value is held at 5–6 during this time by the addition of 20% sodium carbonate solution. On completion of the reaction the dye is precipitated with sodium chloride and cooling, filtered off and 10 parts of 3-nitrobenzene-1-sulfonate
15 parts of calcined sodium carbonate 1,000 parts total The print is dried, steamed for 10 minutes at 102–104°, and rinsed well in cold and in warm water. It is then soaped for 10 minutes at the boil with a 0.3% soap solution in distilled water, rinsed again and dried. A brown print with excellent wet fastness properties is obtained.

The following Table 5 contains further metalliferous azo dyestuffs produced in a manner similar to that described in Example 62; they are the 1:2 chromium or 1:2 cobalt complex compounds of the dystuffs of the formula

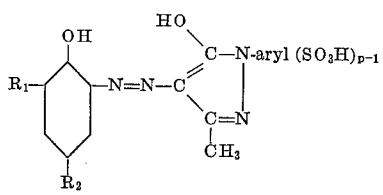

and are characterized by the symbols $R_1$ and $R_2$ (Columns I and II), the radical -aryl $(SO_3H)_{p-1}$ (Column III), the metal used for the metal complex formation (Column IV) and the shade of the dyeing on cotton (Column V); in Columns I or II dichloropyr. and dibromopyr. represent

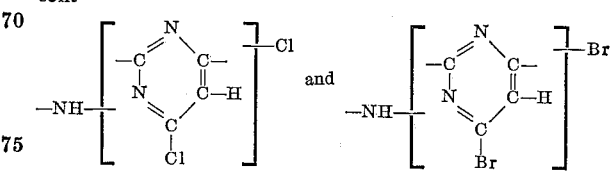

TABLE 5

| Example No. | (I) | (II) | (III) | (IV) | (V) |
|---|---|---|---|---|---|
| 63 | Dichloropyr | —SO₃H | 2,5-dichloro-4-sulfophenyl | Cr | Red-brown. |
| 64 | Dichloropyr | —SO₃H | 4-sulfophenyl | Cr | Do. |
| 65 | Dibromopyr | —SO₃H | do | Cr | Do. |
| 66 | Dibromopyr | —SO₃H | 2,5-disulfophenyl | Co | Yellow-brown. |
| 67 | Dichloropyr | —SO₃H | do | Co | Do. |
| 68 | Dichloropyr | —SO₃H | 4-sulfophenyl | Co | Do. |
| 69 | Dichloropyr | —SO₃H | 5,7-disulfonaphthyl-2 | Cr | Red-brown. |
| 70 | —SO₃H | Dichloropyr | do | Co | Yellow-brown. |
| 71 | —SO₃H | Dichloropyr | 4-sulfophenyl | Co | Do. |
| 72 | —SO₃H | Dichloropyr | do | Cr | Red-brown. |
| 73 | —SO₃H | Dichloropyr | 2,5-dichloro-4-sulfophenyl | Cr | Do. |
| 74 | —SO₃H | Dichloropyr | 2,5-disulfophenyl | Cr | Do. |
| 75 | —SO₃H | Dibromopyr | do | Cr | Do. |
| 76 | Dichloropyr | —SO₃H | Phenyl | Cr | Do. |
| 77 | Dichloropyr | —SO₃H | 4-aminosulfonylphenyl | Co | Yellow-brown. |

Formulae of representative dyestuffs of the foregoing examples are as follows:

*Example 1*

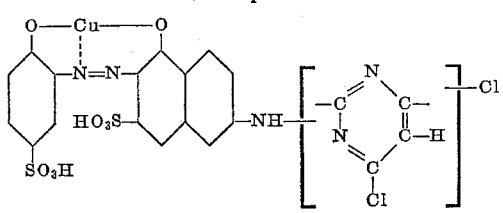

*Example 23*

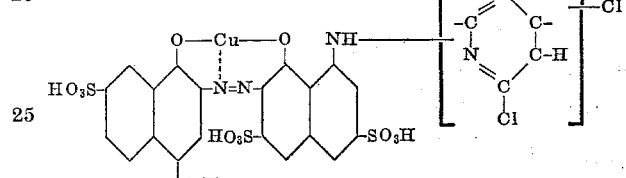

*Example 31*

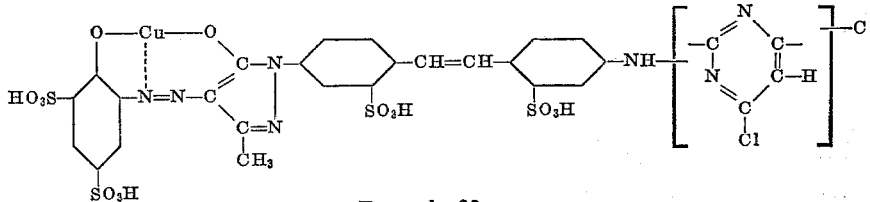

*Example 32*

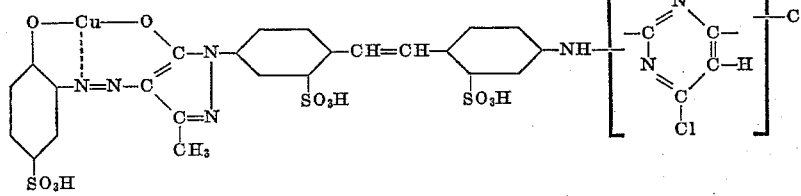

*Example 4*

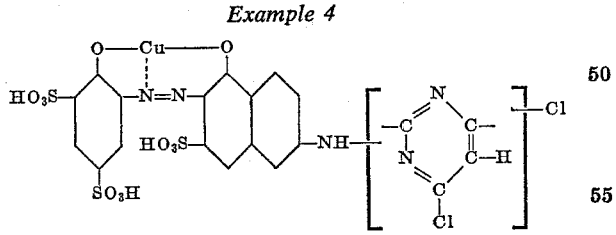

*Example 42*

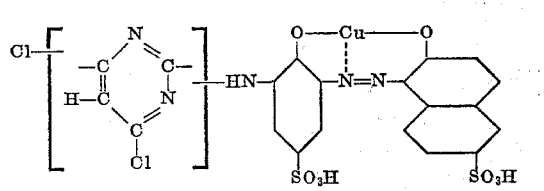

*Example 6*

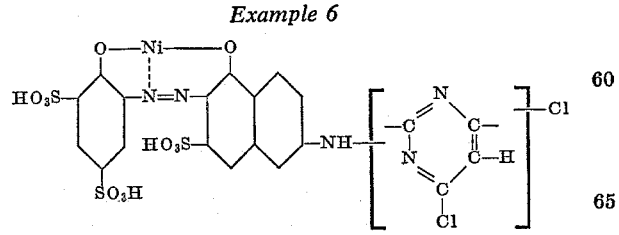

*Example 44*

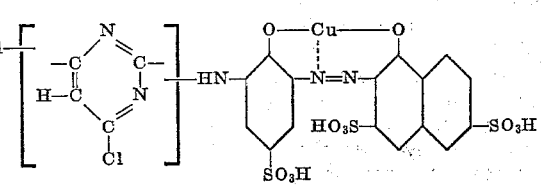

*Example 20*

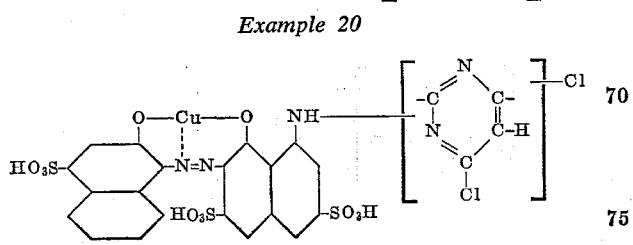

*Example 45*

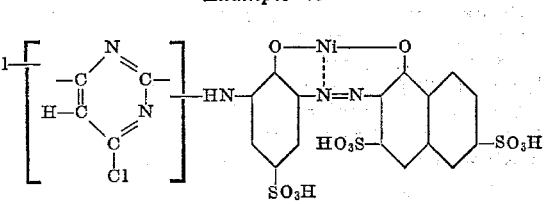

Example 62
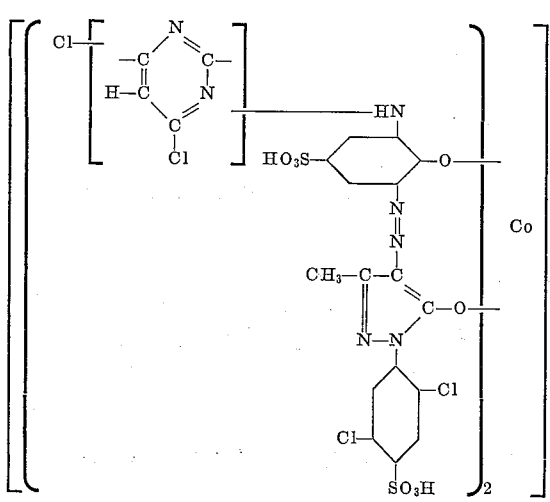
Example 63
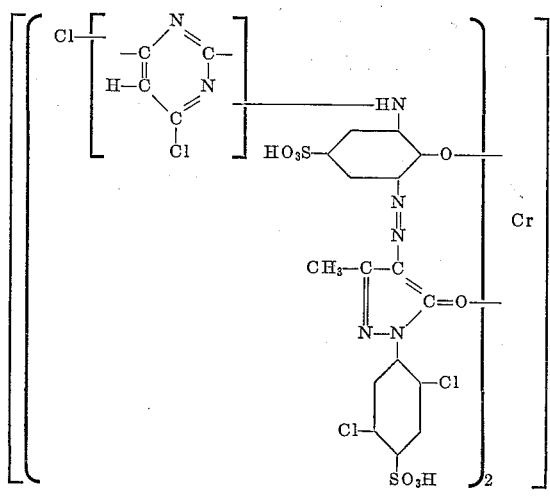
Example 64
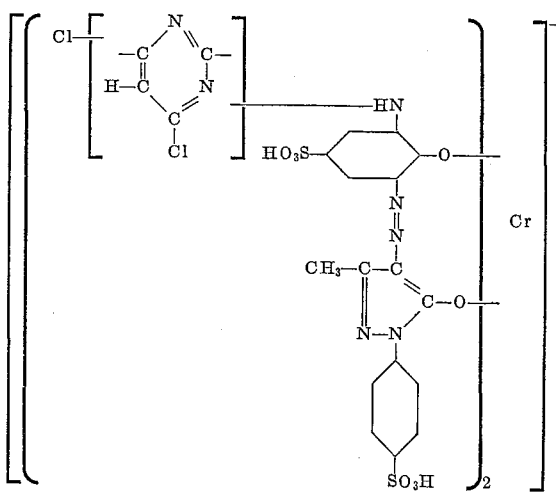
Example 68
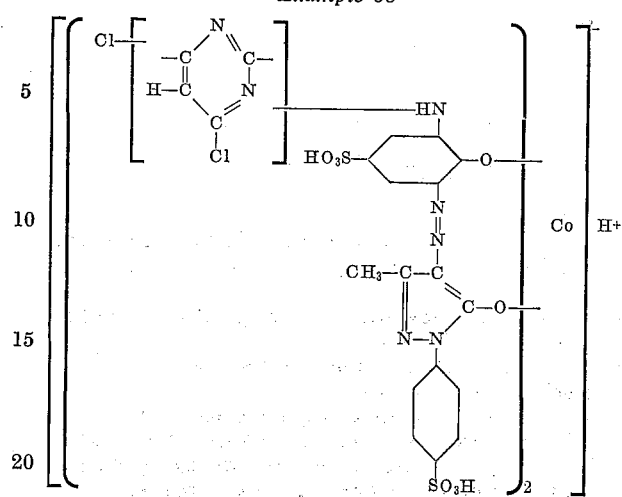
Having thus disclosed the invention what we claim is:
1. A metal-complex dyestuff selected from the group consisting of
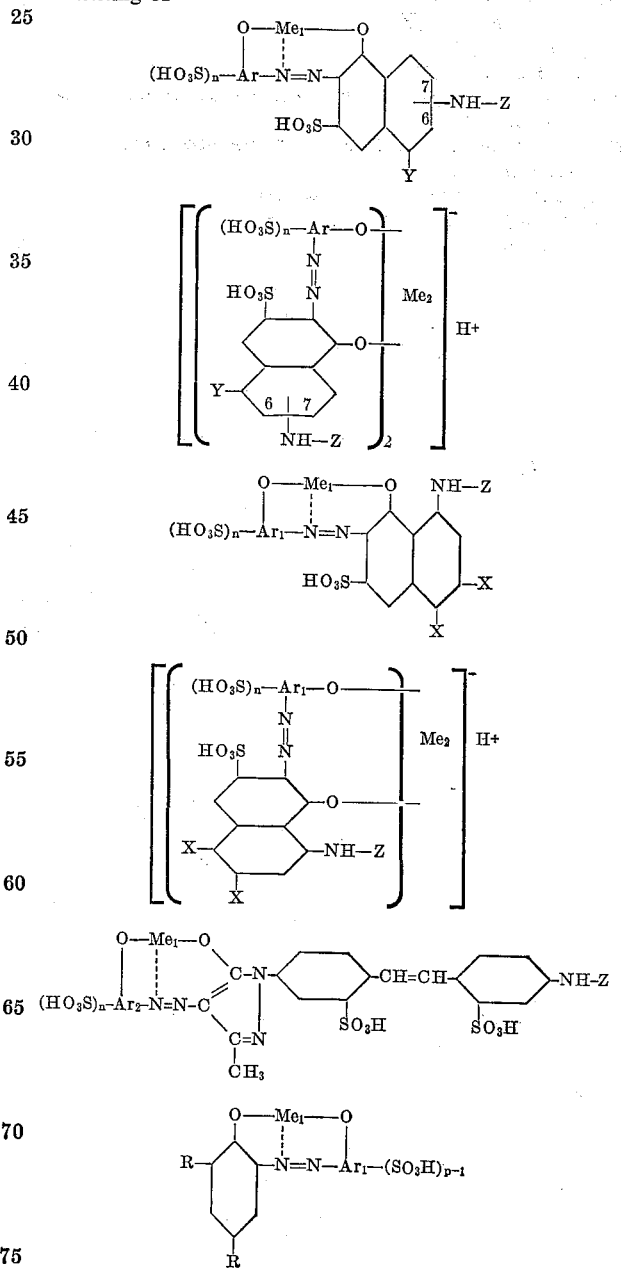

and

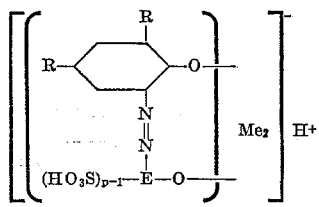

wherein
Ar is an aromatic radical selected from the benzene and naphthalene series bearing —O— in ortho-position to —N=N—,
$Ar_1$ is a naphthalene radical bearing —O— in ortho-position to —N=N—,
$Ar_2$ is a radical of the benzene series bearing —O— in ortho-position to —N=N—,
E—O— is the radical of a coupling component bearing —O— in a position vicinal to —N=N— and selected from the group consisting of the hydroxynaphthalene and the 5-pyrazolone series (in the enolized form),
Y is a member selected from the group consisting of hydrogen and —$SO_3H$,
one X is a hydrogen atom,
the other X is —$SO_3H$,
one R is —$SO_3H$,
the other R is —NH—Z,
$Me_1$ is a metal atom selected from the group consisting of copper and nickel,
$Me_2$ is a metal atom selected from the group consisting of chromium and cobalt,
n is an integer from 1 to 2, inclusive,
p is an integer from 1 to 3 inclusive,
and Z is the radical

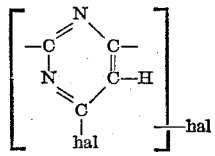

hal being a halogen atom with an atomic number from 17 to 35, inclusive.

2. The metal-containing dyestuff of the formula

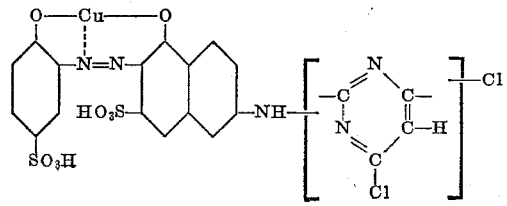

3. The metal-containing dyestuff of the formula

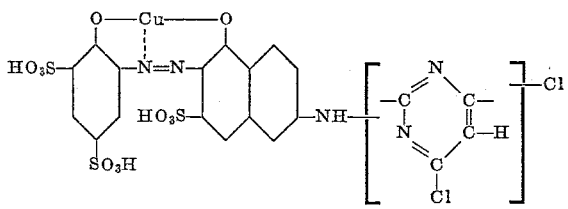

4. The metal-containing dyestuff of the formula

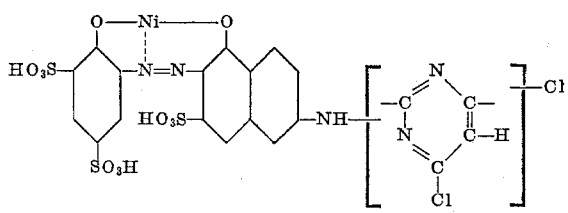

5. The metal-containing dyestuff of the formula

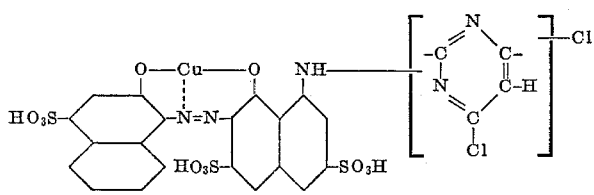

6. The metal-containing dyestuff of the formula

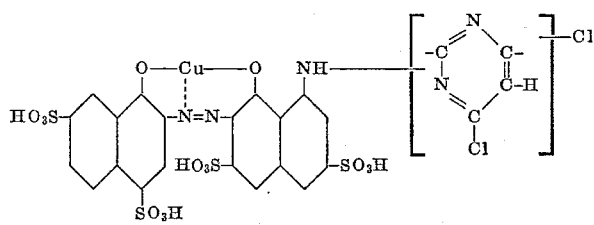

7. The metal-containing dyestuff of the formula

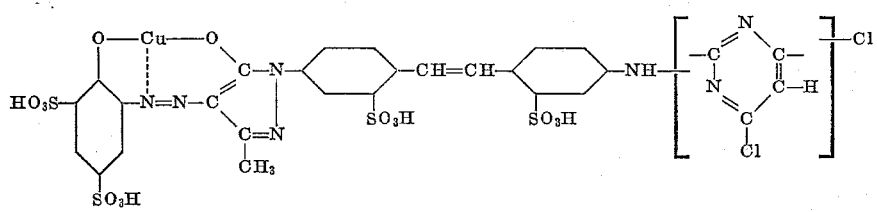

8. The metal-containing dyestuff of the formula

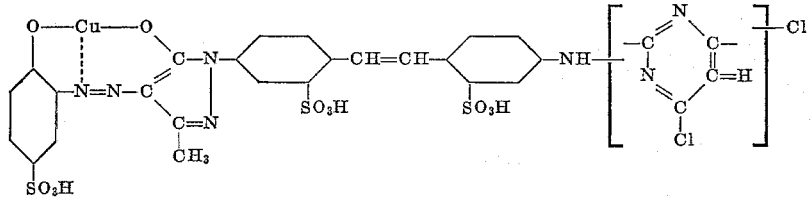

9. The metal-containing dyestuff of the formula

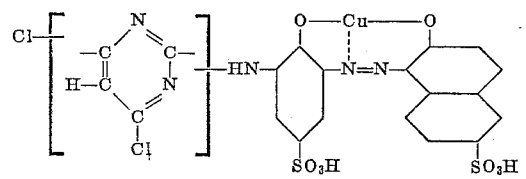

10. The metal-containing dyestuff of the formula

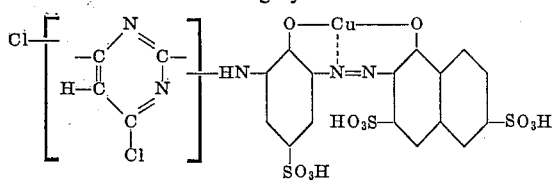

11. The metal-containing dyestuff of the formula

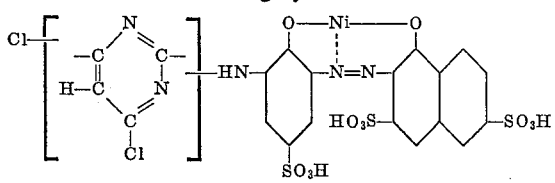

12. The metal-containing dyestuff of the formula

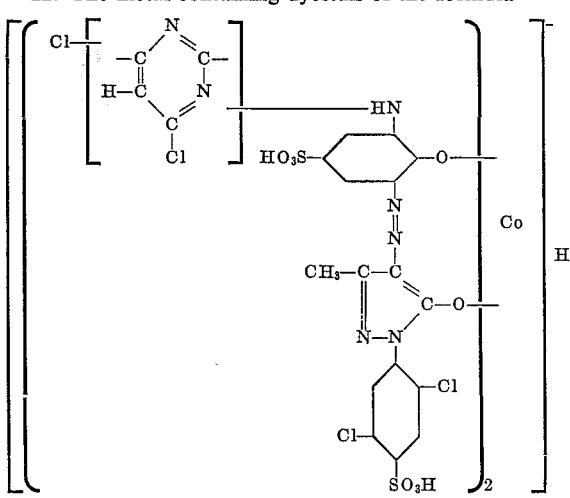

13. The metal-containing dyestuff of the formula

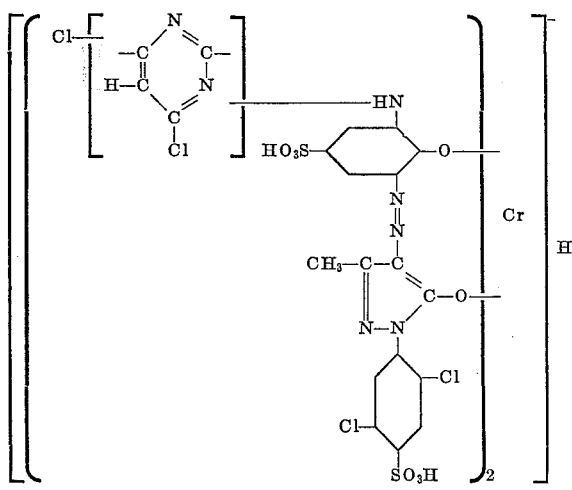

14. The metal-containing dyestuff of the formula

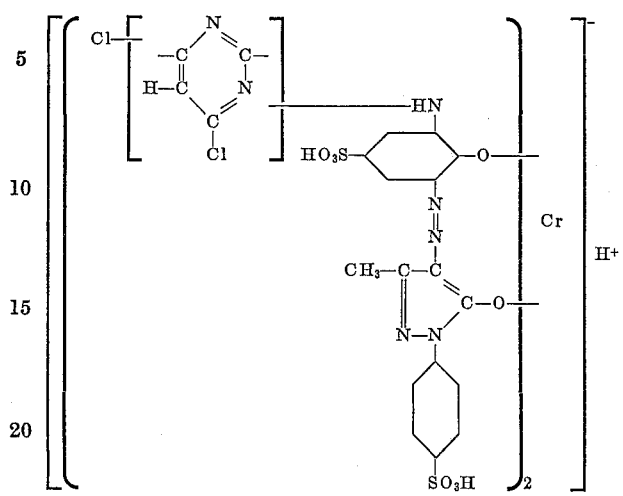

15. The metal-containing dyestuff of the formula

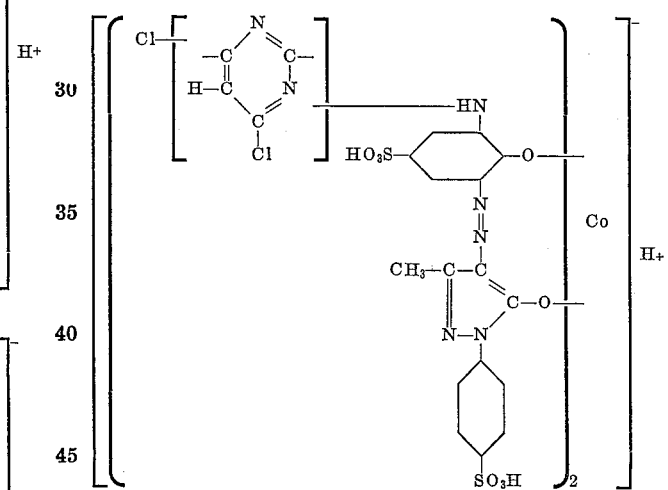

References Cited by the Examiner

UNITED STATES PATENTS

| | | | |
|---|---|---|---|
| 1,886,480 | 11/1932 | Haller et al. | 260—153 |
| 2,820,785 | 1/1958 | Zollinger et al. | 260—154 |
| 2,929,809 | 3/1960 | Menzi et al. | 260—146 |
| 2,935,506 | 5/1960 | Heslop et al. | 260—154 |
| 3,208,990 | 9/1965 | Benz et al. | 260—146 |

CHARLES B. PARKER, *Primary Examiner.*

REYNOLD J. FINNEGAN, DONALD M. PAPUGA,
*Assistant Examiners.*